United States Patent [19]

Haskell

[11] 4,329,029
[45] May 11, 1982

[54] CAMERA CONTROLLER

[76] Inventor: Raphael Haskell, 12 Elmcroft Crescent, London NW11 9SY, England

[21] Appl. No.: 186,762

[22] Filed: Sep. 12, 1980

Related U.S. Application Data

[63] Continuation of Ser. No. 960,865, Nov. 15, 1978, abandoned, which is a continuation-in-part of Ser. No. 863,707, Dec. 23, 1977, abandoned, which is a continuation of Ser. No. 729,954, Oct. 6, 1976, abandoned.

[30] Foreign Application Priority Data

Oct. 9, 1975 [GB] United Kingdom ............... 41471/75
Oct. 8, 1976 [JP] Japan ................................ 51/120439
Oct. 8, 1976 [DE] Fed. Rep. of Germany ....... 2645541

[51] Int. Cl.³ ............................................. G03B 7/097
[52] U.S. Cl. ................... 354/23 D; 354/30; 354/289; 364/525
[58] Field of Search .................... 354/23 D, 30, 60 R, 354/289; 364/525

[56] References Cited

U.S. PATENT DOCUMENTS 4,103,307 7/1978 Shinoda et al. ................. 354/23 D Primary Examiner—L. T. Hix
Assistant Examiner—Stafford D. Schreyer
Attorney, Agent, or Firm—Christie, Parker & Hale

[57] ABSTRACT

In a camera, a camera controller which maintains the camera in a state of maximum readiness while facilitating operator adjustment of the camera setting by means of a single control so as to allow a choice between depth of focus and the ability of the camera to freeze movement, said controller comprising a bias adjustor which provides a signal indicative of the desired relationship between f-number and shutter speed, and a processor connected to receive the said signal and a signal representative of the exposure value which in response to said signals determines the optimum shutter speed and f-number for the given conditions and bias setting and provides signals for setting the f-number and shutter speed in the camera. In one embodiment the said determination is effected by calculation by means of a microprocessor subroutine and in a second embodiment it is effected in a microprocessor subroutine by reference to tables of values stored in an ROM.

30 Claims, 29 Drawing Figures

Fig. 13

| | 0 | 1 | 2 | 3 | 4 | 5 | 6 | 7 | 8 | |
|---|---|---|---|---|---|---|---|---|---|---|
| | \multicolumn{9}{c}{SHUTTER SPEED RANGE 1 TO 1/1000 SEC. F-NUMBER RANGE F1·4 TO F22} | |
| BIAS | -1/2 | -3/8 | -1/4 | -1/8 | 0 | 1/8 | 1/4 | 3/8 | 1/2 | |
| BINARY CODE | 0000 | 0001 | 0010 | 0011 | 0100 | 0101 | 0110 | 0111 | 1000 | (FULL SIZE) |
| EV 1 | 1/2000 | 1/2001 | 1/2002 | 1/2003 | 1/2004 | 1/2005 | 1/2006 | 1/2007 | 1/2008 | |
| 2 | 1/2010 | 1 1/8 | 1 1/4 | 1 3/8 | 1 1/2 | 1 5/8 | 1 3/4 | 1 7/8 | 2 | |
| 3 | 1/2020 | 1 1/4 | 1 1/2 | 1 3/4 | 2 | 2 1/4 | 2 1/2 | 2 3/4 | 3 | |
| 4 | 1/2030 | 1 3/8 | 1 3/4 | 2 1/8 | 2 1/2 | 2 7/8 | 3 1/4 | 3 5/8 | 4 | |
| 5 | 1/2040 | 1 1/2 | 2 | 2 1/2 | 3 | 3 1/2 | 4 | 4 1/2 | 5 | |
| 6 | 1/2050 | 1 5/8 | 2 1/4 | 2 7/8 | 3 1/2 | 4 1/8 | 4 3/4 | 5 3/8 | 6 | |
| 7 | 1/2060 | 1 3/4 | 2 1/2 | 3 1/4 | 4 | 4 3/4 | 5 1/2 | 6 1/4 | 7 | |
| 8 | 1/2070 | 1 7/8 | 2 3/4 | 3 5/8 | 4 1/2 | 5 3/8 | 6 1/4 | 7 1/8 | 8 | |
| 9 | 1/2080 | 2 | 3 | 4 | 5 | 6 | 7 | 8 | 9 | |
| 10 | 1/2090 | 2 | 3 | 4 | 5 | 6 | 7 | 8 | 9 | |
| 11 | 1/20A0 | 2 | 3 | 4 | 5 | 6 | 7 | 8 | 9 | |
| 12 | 2/20B0 | 2 7/8 | 3 3/4 | 4 5/8 | 5 1/2 | 6 3/8 | 7 1/4 | 8 1/8 | 9 | |
| 13 | 3/20C0 | 3 3/4 | 4 1/2 | 5 1/4 | 6 | 6 3/4 | 7 1/2 | 8 1/4 | 9 | |
| 14 | 4/20D0 | 4 5/8 | 5 1/4 | 5 7/8 | 6 1/2 | 7 1/8 | 7 3/4 | 8 3/8 | 9 | |
| 15 | 5/20E0 | 5 1/2 | 6 | 6 1/2 | 7 | 7 1/2 | 8 | 8 1/8 | 9 | |
| 16 | 6/20F0 | 6 3/8 | 6 3/4 | 7 1/8 | 7 1/2 | 7 7/8 | 8 1/4 | 8 5/8 | 9 | |
| 17 | 7/2100 | 7 1/4 | 7 1/2 | 7 3/4 | 8 | 8 1/4 | 8 1/2 | 8 3/4 | 9 | |
| 18 | 8/2110 | 8 1/8 | 8 1/4 | 8 3/8 | 8 1/2 | 8 5/8 | 8 3/4 | 8 7/8 | 9 | |
| 19 | 9/2120 | 9/2121 | 9/2122 | 9/2123 | 9/2124 | 9/2125 | 9/2126 | 9/2127 | 9/2128 | |

Fig. 16
| ADDRESS | SYMBOL | CONTENTS | |
|---|---|---|---|
| 1000 | M1 | SMIN + FMIN | ROM |
| 1001 | M2 | SMIN + FMAX | |
| 1002 | M3 | SMAX + FMIN | |
| 1003 | M4 | SMAX + FMAX | |
| 1004 | M5 | FMIN − SMIN | |
| 1005 | M6 | FMIN + SMIN | |
| 1006 | M7 | FMAX − FMIN | |
| 1007 | M8 | FMAX + FMIN | |
| 1008 | M9 | FMAX + SMAX | |
| 1009 | M10 | FMAX − SMAX | |
| 100A | M11 | FMAX + FMIN | |
| 400B | R1 | OFFSET | RAM |
| 400C | R2 | F REF | |
| 400D | R3 | S REF | |
| 400E | R4 | F SET | |
| 400F | R5 | S SET | |
Fig. 17
| REGISTER | CONTENTS |
|---|---|
| B | EV |
| C | BIAS |
| D | WORKING REG. |
| E | WORKING REG. |
| H+L | ADDRESS REG. PAIR |
| ACC | ACCUMULATOR |
| SP | STACK POINTER |
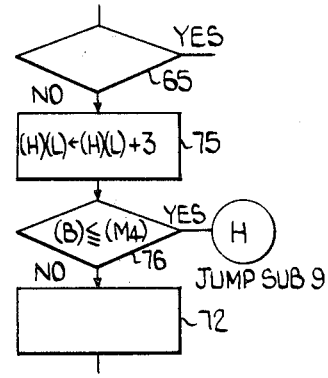
Fig. 27
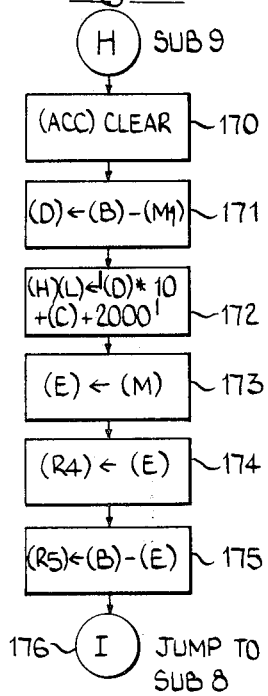
Fig. 28

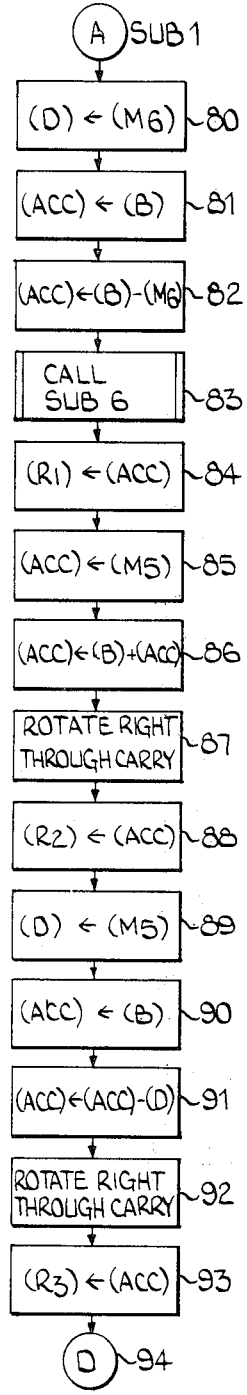
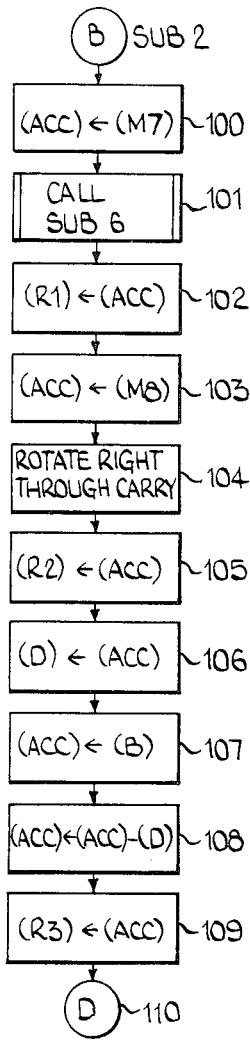
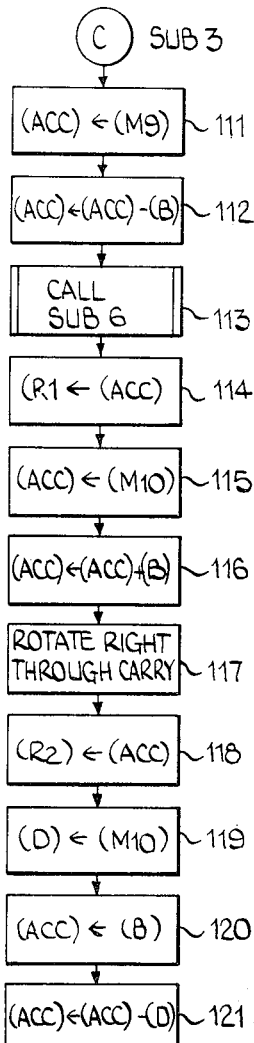
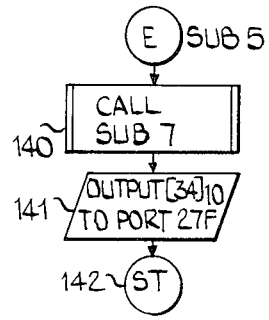

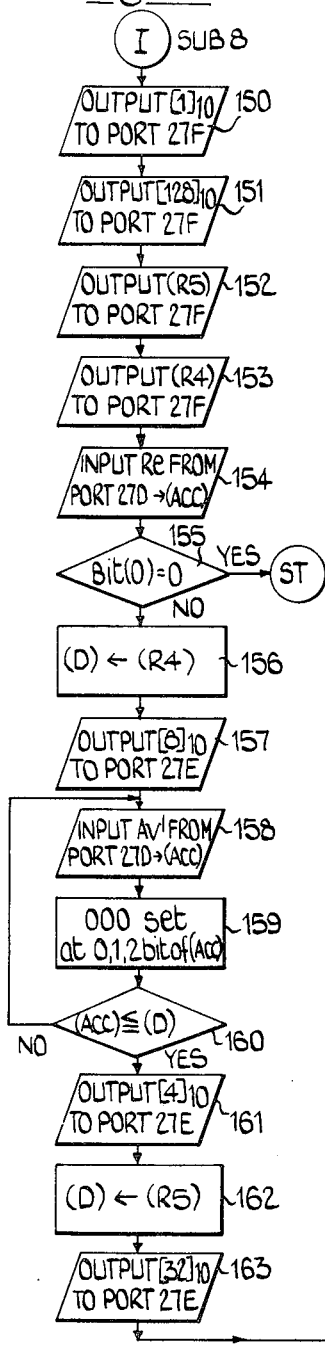
Fig. 26
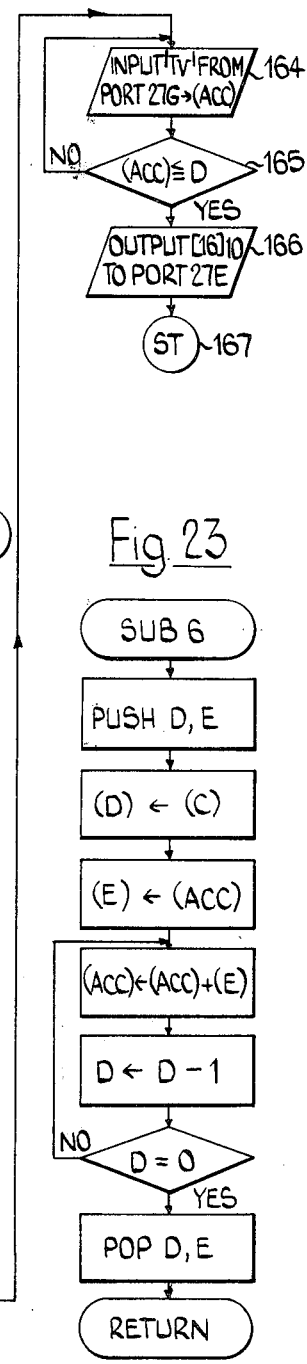
Fig. 23
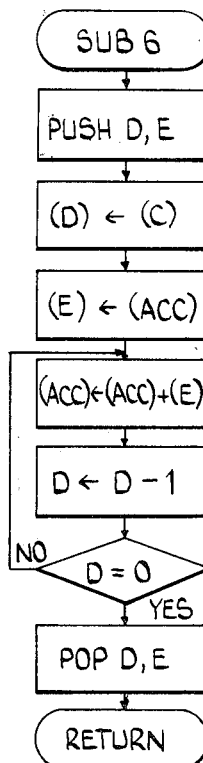
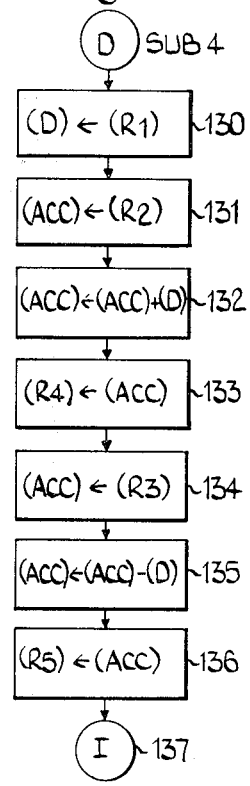
Fig. 22
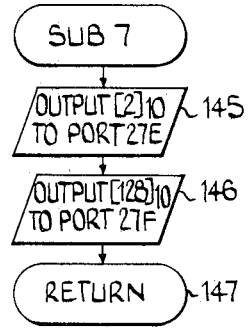
Fig. 25

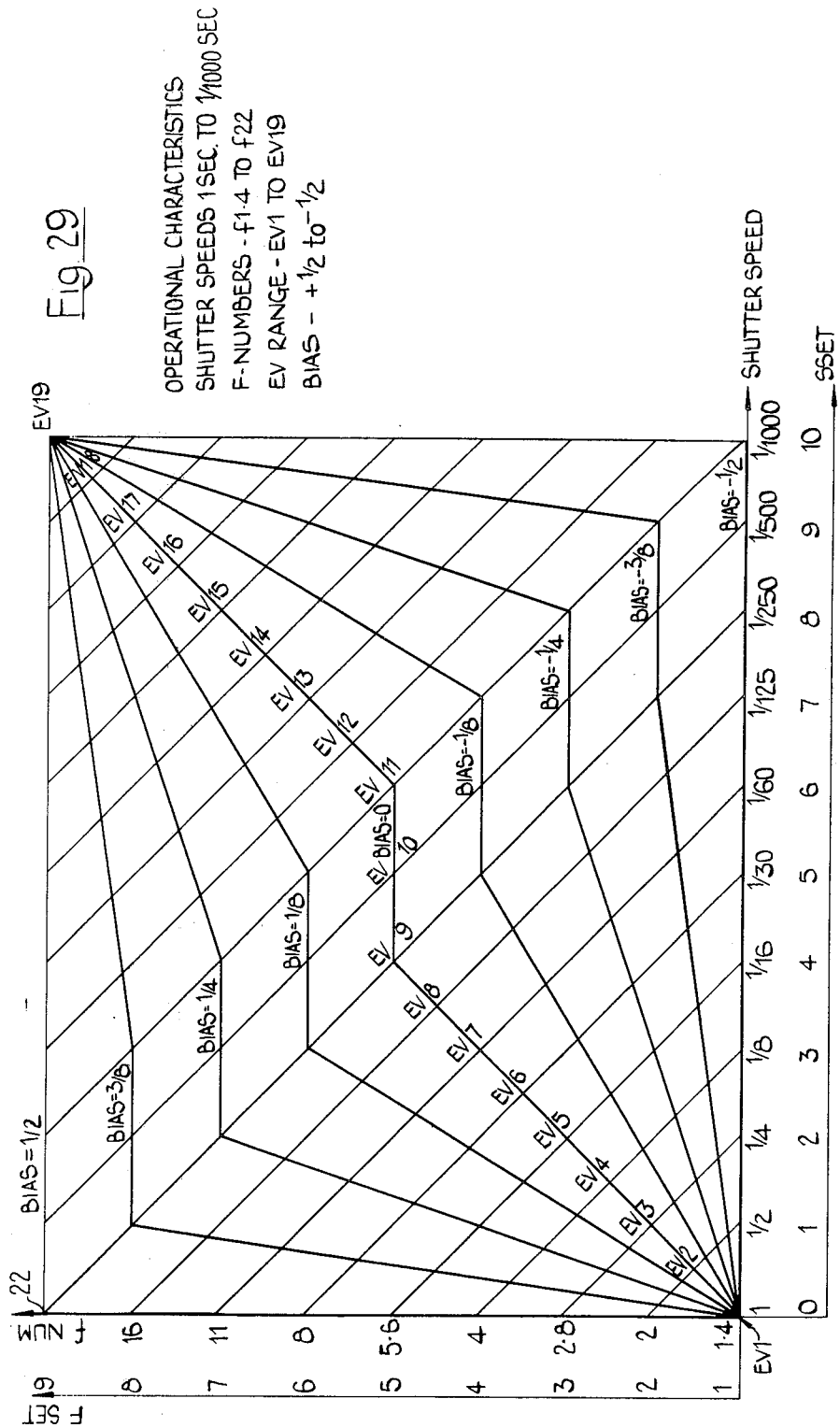

CAMERA CONTROLLER

CROSS REFERENCE TO RELATED APPLICATIONS

This is a continuation of application Ser. No. 960,865, filed Nov. 15, 1978, which in turn was a continuation-in-part of application Ser. No. 863,707, filed Dec. 23, 1977, which in turn was a continuation of application Ser. No. 729,954, filed Oct. 6, 1976. Each of said earlier applications is now abandoned.

BACKGROUND OF THE INVENTION

This invention relates to a controller for use with a camera whereby the camera can be put into or be maintained in a state of maximum readiness whilst facilitating operator adjustment by means of a single control so as to allow a choice between depth of focus and the ability of the camera to freeze movement. By the expression "state of maximum readiness" is meant herein that the camera is enabled to take a correctly exposed photograph irrespective of the setting of the said control whenever the exposure value required lies within the range of exposure values corresponding to the shutter and lens of the camera.

Various mechanisms are already known to be incorporated in cameras for the purpose of controlling the shutter speed and the f-number in relation to the required exposure. Usually they are of one or other of two types, namely the so-called "shutter priority" system and the "f-number priority" system. With the shutter priority system the operator selects the shutter speed to his requirements and the said mechanism automatically selects the appropriate f-number for the available light and the speed of the film in use. With the f-number priority system the operator selects the f-number required and the mechanism takes care of the shutter speed. In both systems supervision of the camera setting by the operator is necessary and usually some manual adjustment thereof is required, even though the exposure value needed lies within the exposure value range of shutter and lens of the camera.

A somewhat less sophisticated system is known, called the "fully programmed" system which selects both f-number and shutter speed automatically. This system does maintain the camera in a state of maximum readiness but it denies the operator any control over the f-number and shutter speed. Such control is desirable because the operator may wish to vary the depth of focus or avoid blurring of the image on the film due to rapid movement of objects in the camera's field of view.

There is also a camera controller system known, built into a camera, which incorporates both the shutter speed priority system and the f-number priority system. A manually operated selector switch determines which of the two systems is to be operative. The operator sets the switch according to his choice of priority and then sets the required parameter, i.e. aperture or shutter speed of the camera, with the respective manual control. A digital computer incorporated in the camera then determines the setting of the other parameter for the instant brightness (i.e. the setting of the shutter speed or the aperture respectively) where it is possible to do so. If the calculated setting of the second said parameter is outside the range of the camera, and therefore impossible, the controller sets it at the limiting value (maximum or minimum as the case may be), recalculates the first said parameter for optimum performance, and resets the latter automatically.

With the present invention the operator has only one variable control to concern himself with, namely the bias setting. For all acceptable values of brightness for the camera, an internal controller automatically selects an optimum set of f-number and shutter speed values and provides f-number and shutter speed setting signals in which the relationship of f-number and shutter speed is a function of the bias setting. A uniform variation of f-number and shutter speed settings over the whole of the bias setting range is provided and when the operator wishes to alter the relationship of these two parameters he has only to alter the bias control to a new setting. The controller may be arranged such that the camera is always in a state of maximum readiness without it being necessary for the operator to make any form of adjustment of the aperture and shutter controls.

Thus it is an object of this invention to provide a new and improved controller for a camera.

It is a further object of this invention to provide controller means which will enable the camera operator to maintain his camera in a state of maximum readiness yet facilitate continuous operator control over the depth of focus and the ability of the camera to freeze movement.

SUMMARY OF THE INVENTION

The present invention provides in a camera having means for determining the exposure value a camera-setting control comprising an operator-set bias adjustor which in relation to its setting provides a signal representative of a desired relationship between f-number and shutter speed, and a processor connected to receive the said signal which in response thereto, and in response to a signal representative of the exposure value, determines the optimum shutter speed and f-number for the given conditions and bias setting.

In a preferred embodiment of the controller the controller is built into the camera together with a conventional light intensity determining device (which provides a light value signal for the determination of the exposure value) and means for setting shutter shutter speed and f-numbers automatically from the values calculated by the processor. The controller may be triggered into the operation by a mechnical release such as the normal shutter cocking device or alternatively it may operate cyclically thereby constantly resetting the camera. Various ways of implementing the controller are possible and in an arrangement discussed in further detail herein it comprises a microprocessor, incorporating a read only memory (ROM) and a random access memory (RAM), in combination with input and output devices.

BRIEF DESCRIPTION OF THE DRAWINGS

Several advantageous embodiments of the controller according to the invention are illustrated in the accompanying drawings. The associated camera is not shown, however, as the arrangement of the controller in conjunction therewith or therein is entirely within the skill of those practised in the art. In the drawings:

FIG. 13 is a table of values of FSET showing the binary code used in the embodiment of FIG. 10 and addresses;
FIG. 16 is a table of data addresses in ROM/RAM;
FIG. 17 is a table of registers used for temporary storage;
FIGS. 18-28 are flowcharts for the controller using the Intel 8080A circuit describing program steps corresponding to the embodiments described in FIGS. 3 to 12;
and
FIG. 29 is a graphical illustration of the operational characteristics of a camera equipped with a controller according to the present invention wherein FSET and SSET is expressed in terms of Ev and BIAS.

The description following hereinafter utilises the expressions BIAS, SSET, SMIN, SMAX, FSET, FMIN FMAX, FREF and SREF. Of these FREF, SREF, SSET and FSET are calculated values and the remainder are camera settings. The expressions are defined as follows:

SREF and FREF are mid range values (i.e. with bias adjuster set to the mid point) for shutter speed and aperture corresponding to respective exposure values.

BIAS is a value corresponding to the setting of the bias control.

SSET is a value corresponding to the logarithm to the base 2 of the reciprocal of the time period in seconds during which the shutter is open.

SMIN is the minimum value of SSET for the camera.

SMAX is the maximum value of SSET for the camera.

FSET is the value corresponding to twice the logarithm to the base 2 of the f-number of the camera lens setting.

FMIN is the minimum value of FSET for the lens.

FMAX is the maximum value of FSET for the lens.

The exposure value Ev satisfies $SSET+FSET=Ev$ and this property is used to determine SSET and FSET from Ev and BIAS. It should be noted that the following descriptions assume the normal situation obtains in the camera in which $(FMAX-FMIN)$ is less than or equal to $(SMAX-SMIN)$. The occurrence of the opposite situation could be simply dealt with by interchanging the role of SMAX SMIN SREF SSET with FMAX FMIN FREF FSET in the various flowcharts of the preferred embodiment.

Figure 1:
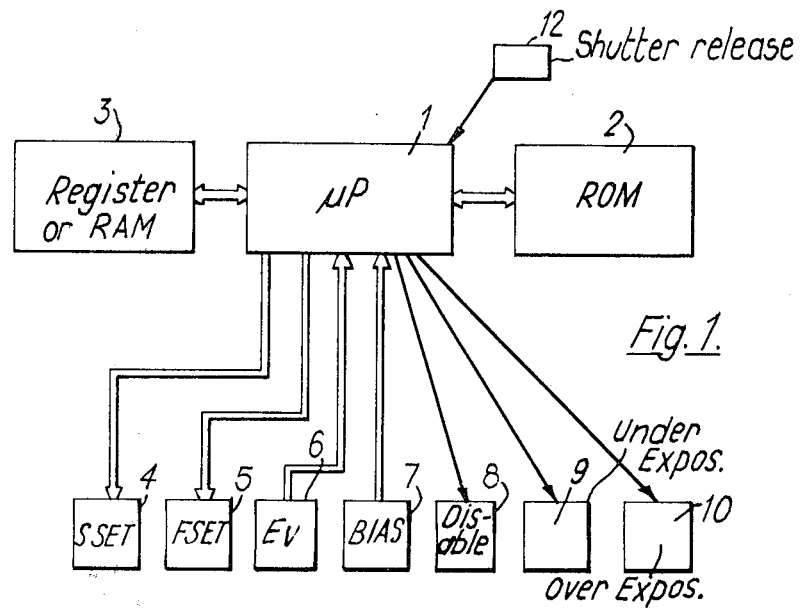
FIG. 1 is a functional diagram of a camera controller according to the invention.

Referring now to FIG. 1, the invention comprises a microprocessor 1 which is coupled to an ROM 2 and to a register or RAM 3. ROM 2 contains the program for the microprocessor. Register or RAM 3 holds values relating to the lens and shutter parameters and also the working values. The microprocessor 1 interfaces with a plurality of input and output devices 4 to 8 as follows: device 4 is used for setting shutter time, device 5 is used for setting f number, device 6 determines the exposure value, device 7 is the input of BIAS and device 8 is a disabling device. In addition signals are provided representative of under exposure and over exposure conditions in the camera, which signals operate ON/OFF indicators 9 and 10. These indicators provide a warning to the operator that his camera is disabled as a consequence of the existence therein of the corresponding one of the said conditions. Lastly a shutter release signal is provided by the shutter release device 12.

Figure 2:
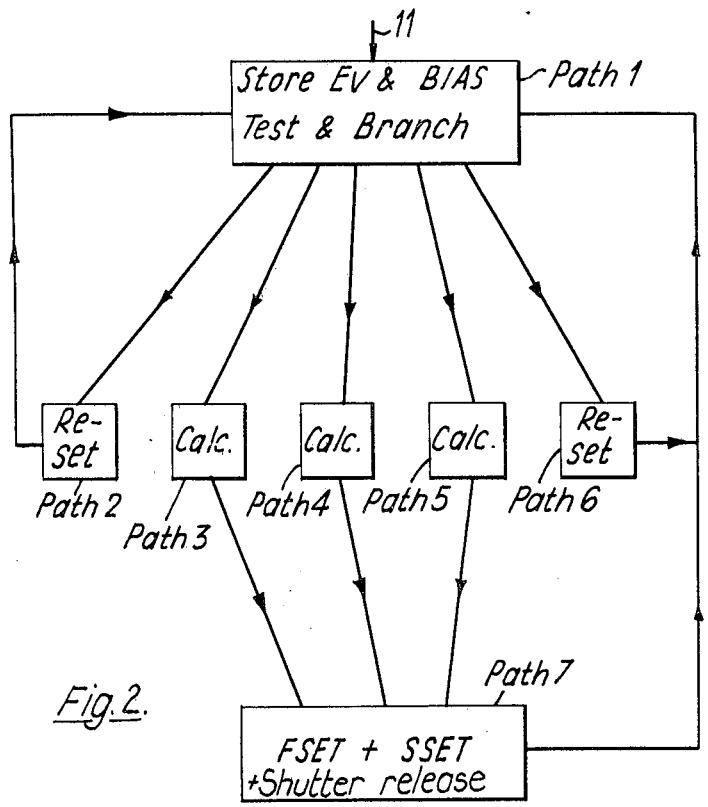
FIG. 2 is a schematic flowchart of control program of a first embodiment of the controller of FIG. 1 showing a decomposition into the flow paths Path 1 to Path 7.
Figure 4:
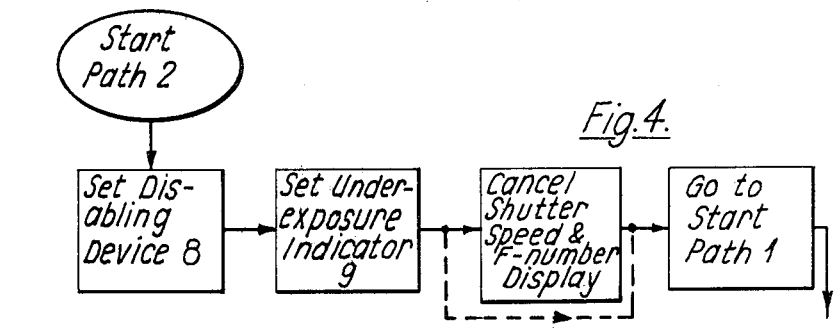
FIG. 4 is a flowchart of Path 2.
Figure 8:
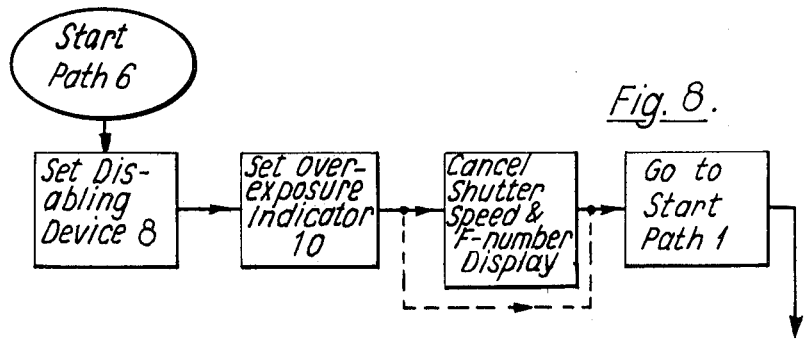
FIG. 8 is a flowchart of Path 6.
Figure 3:
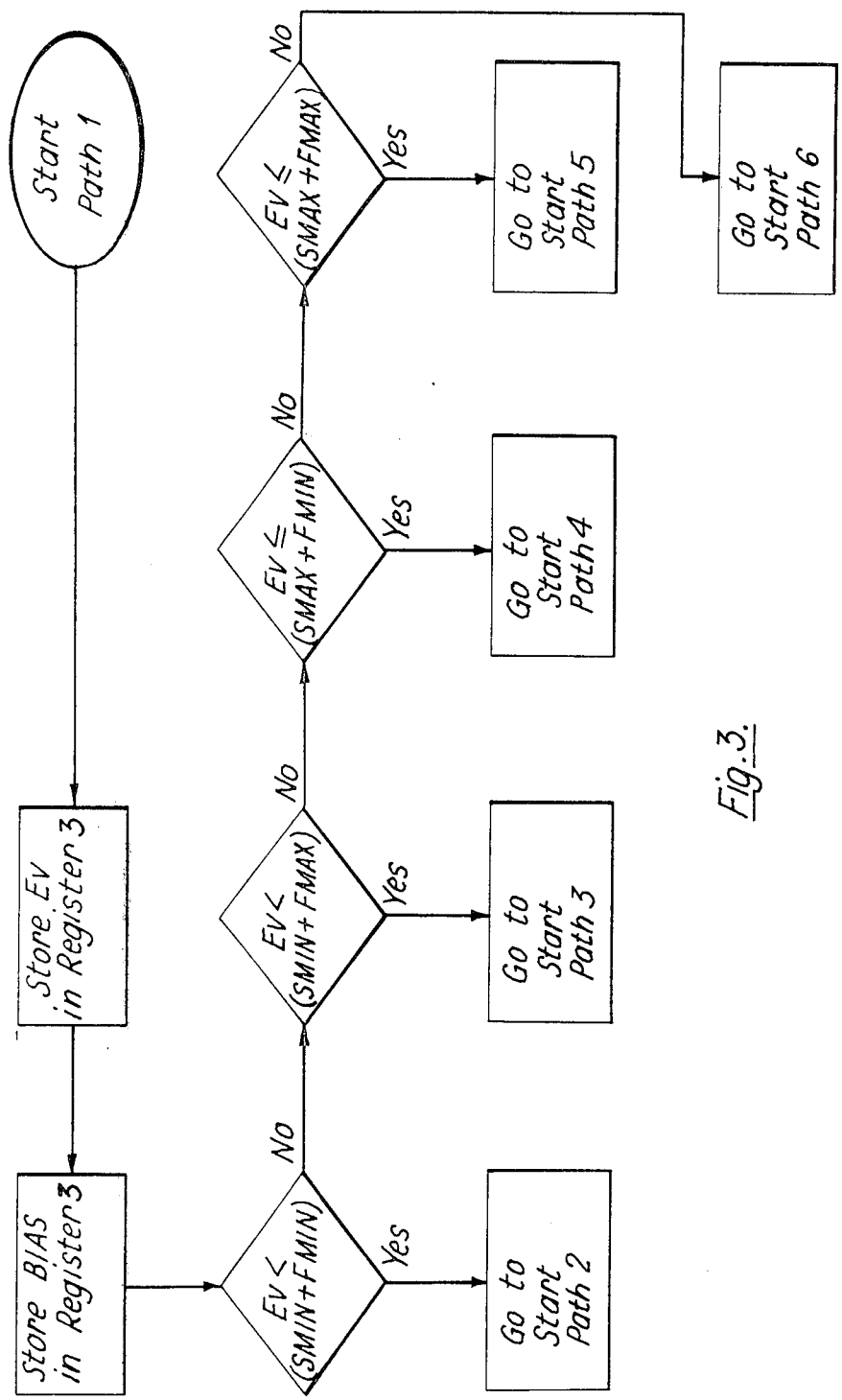
FIG. 3 is a flowchart of Path 1.
Figure 5:
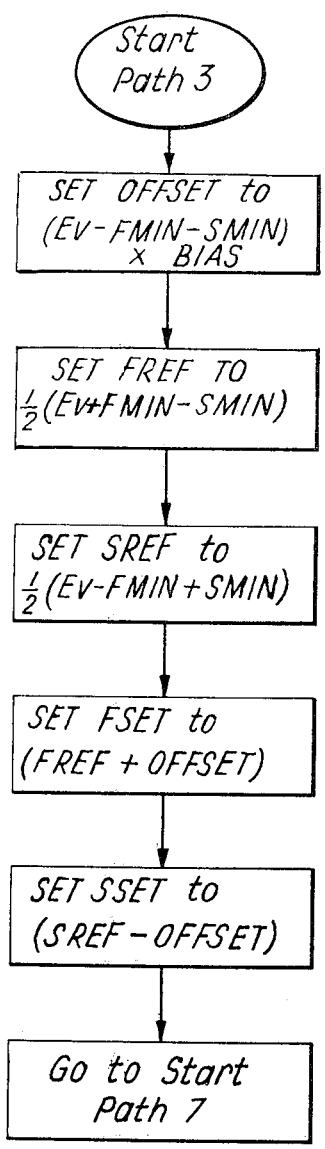
FIG. 5 is a flowchart of Path 3.
Figure 6:
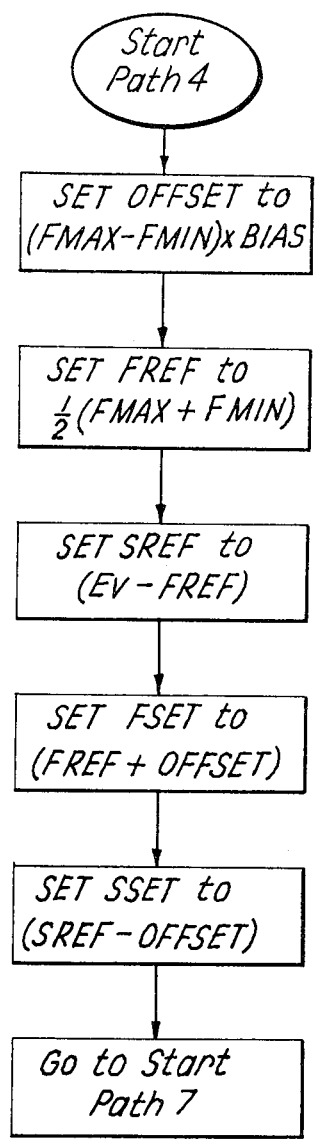
FIG. 6 is a flowchart of Path 4.

The operation of the controller illustrated in FIG. 1 may be best understood by reference to the illustration of the program structure given in FIG. 2 and the flow charts of FIGS. 3 to 9. Thus, referring particularly to FIGS. 2 and 3, operation commences with the occurrence of start signal 11, which may be provided by a trigger. This activates the system which commences at path 1. The Ev value and the bias valve are stored in register or RAM 3 and the Ev value is tested by the microprocessor to determine the range in which it occurs. In accordance with the value of Ev the program branches into one of paths 2 to 6. Path 2 is selected if the test $Ev<(SMIN+FMIN)$ is affirmative. If this test is negative the program steps on to test for $Ev<(SMIN+FMAX)$. If this test is affirmative the program branches to path 3. If the test is negative the program steps on to test $Ev \leq (SMAX+FMIN)$. If this test is affirmative the program branches to path 4. If the test is negative the program steps on to test $Ev \leq (SMAX+FMAX)$. If this test is affirmative the program branches to path 5, if negative the program steps on to path 6.

Paths 2 and 6 which are chosen when the exposure value is unsatisfactory for taking photographs are concerned with disabling the camera by means of device 8, setting the under and over exposure indicators 9 and 10 and cancelling the display of the shutter speed and aperture, if provided. The steps of these branches are given in FIGS. 4 and 8 respectively. Paths 3-5 are chosen when the exposure value is within the range of the camera and the steps thereof are given in FIGS. 5-7.

Path 3 comprises the following steps:
Set OFFSET is $(Ev-SMIN) \times BIAS$
Set FREF to $(Ev+FMIN-SMIN) \times \frac{1}{2}$
Set SREF to $(EV-FMIN+SMIN) \times \frac{1}{2}$
Set FSET to $(FREF+OFFSET)$
Set SSET to $(SREF-OFFSET)$
Go to start of path 7.

Path 4 comprises:
Set OFFSET to $(FMAX-FMIN) \times BIAS$
Set FREF to $(FMAX+FMIN) \times \frac{1}{2}$
Set SREF to $(EV-FREF)$
Set FSET to $(FREF+OFFSET)$
Set SSET to $(SREF-OFFSET)$
Go to start of path 7.

Path 5 comprises:
Set OFFSET to $(FMAX+SMAX-Ev) \times BIAS$
Set FREF to $(EV+FMAX-SMAX) \times \frac{1}{2}$
Set SREF to $(EV-FMAX+SMAX) \times \frac{1}{2}$
Set FSET to $(FREF+OFFSET)$
Set SSET to $(SREF-OFFSET)$
Go to start of path 7.

Figures 7, 9:
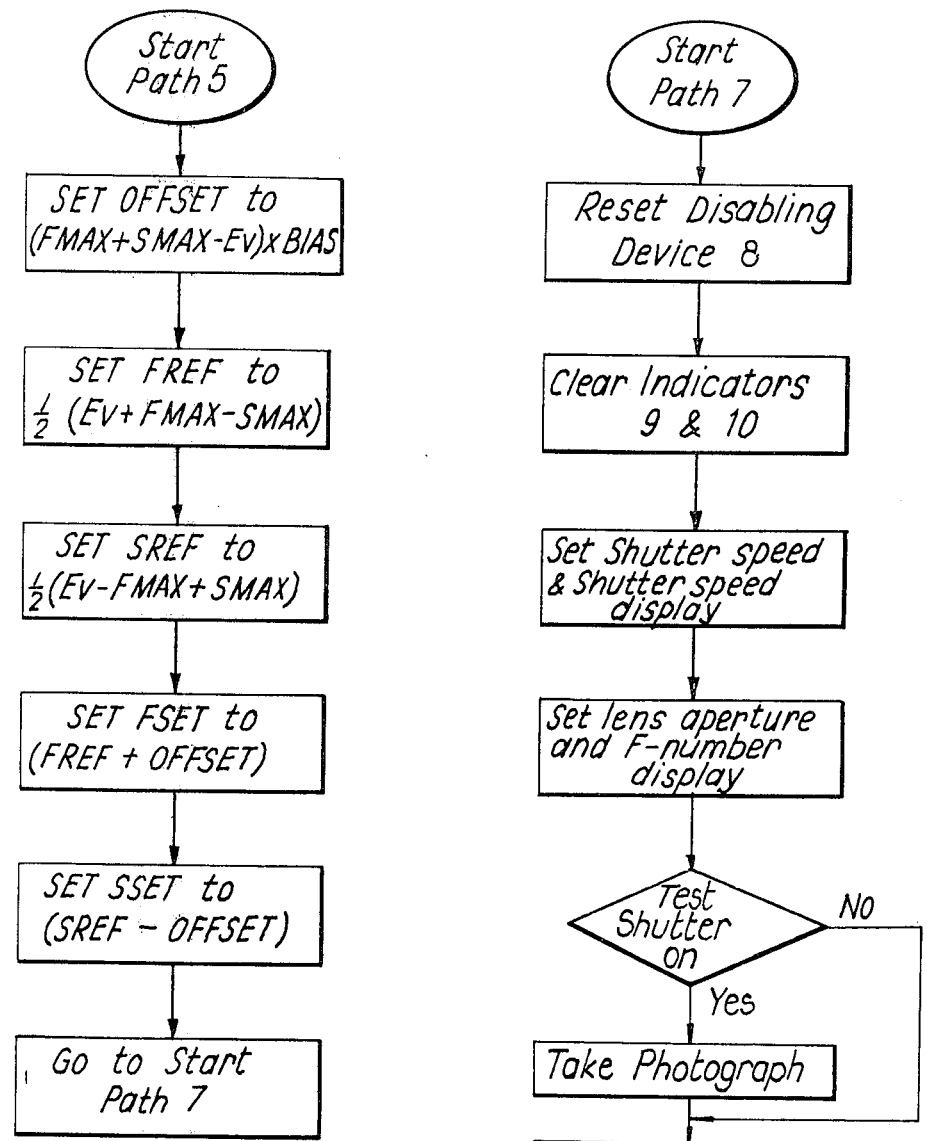
FIG. 7 is a flowchart of Path 5.
FIG. 9 is a flowchart of Path 7.

Path 7, which is shown in FIG. 9, comprises the following operations:
Reset camera disabling device 8
Clear indicator outputs 9 and 10

Set shutter speed and display
Set lens aperture and display
Test if shutter release 12 is on.
If YES, take photograph and go to start of path 1.
If NO, go to start of path 1.

A graphical illustration of how FSET and SSET vary with Ev and BIAS in this controller is given in FIG. 29 which relates to one specific combination of lens and shutter. Different combinations thereof will of course result in different but essentially similar charts.

In an alternate arrangement for utilising the controller of FIG. 1 the ROM contains, in addition to the program, precomputed tables of values of FSET and SSET expressed in terms of Ev and BIAS. An example of such a table is given in FIG. 13. The suffix numbers in the table are examples of addresses in hexadecimal code. If the value of Ev lies between (SMIN+FMIN) and (SMAX+FMAX) then FSET and SSET may be determined from these tables. The operation of this arrangement is described with reference to the schematic flowchart of FIG. 10, the flowchart of FIGS. 11 and 12, and the flowcharts of FIGS. 4, 8 and 9 described earlier. The graphical representation given in FIG. 29 applies equally to this arrangement.

Figure 10:
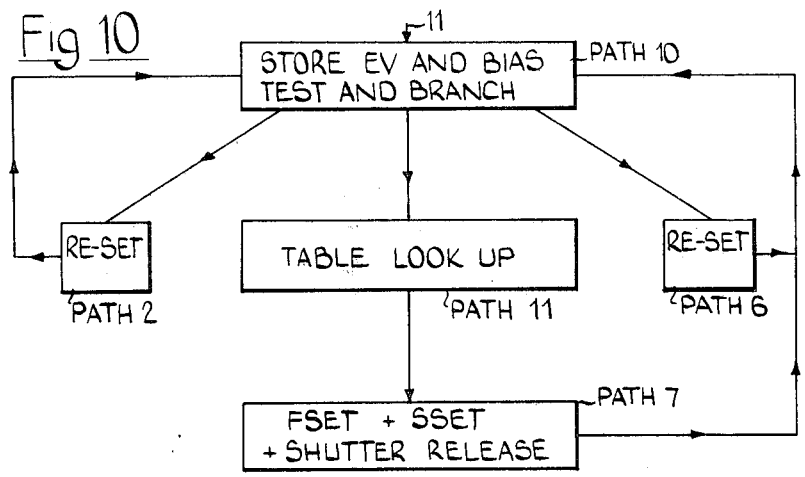
FIG. 10 is a schematic flowchart of the control program of second embodiment of the controller of FIG. 1 showing decomposition into the flow paths, Path 10 and Path 11.
Figure 11:
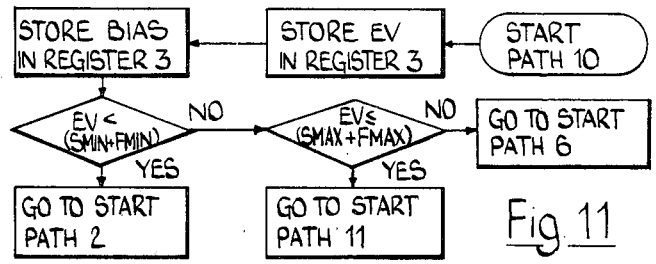
FIG. 11 is a flowchart of Path 10.
Figure 12:
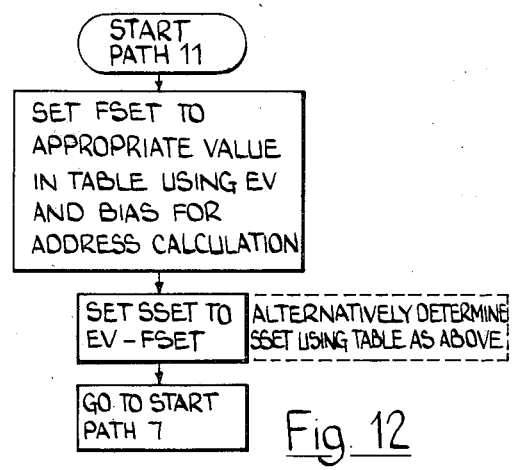
FIG. 12 is a flowchart of Path 11.

Thus with reference particularly to FIGS. 10-12 on occurrence of the start signal 11 the system is activated and commences at path 10. As before the Ev and BIAS value are stored in register or RAM 3 (see FIG. 1) and the Ev value is tested by the microprocessor to determine in which range it occurs. In accordance with the value of Ev the program branches to one of paths 2, 11 or 6. Path 2 is selected if the test Ev<(SMIN+FMIN) is affirmative. If this test is negative the program steps on to test if Ev≦(SMAX+FMAX). If this test is affirmative the program branches to path 11, if negative the program branches to path 6.

Path 11 consists of the following steps. The value FSET is set in the register or RAM 3, being selected by referencing the table, such as the one in FIG. 13, stored in the ROM 2 using the stored value Ev and BIAS for calculation of the address. SSET is set to (Ev−FSET). Alternatively SSET can also be determined from a table as above. The program then goes to the start of path 7 as before.

Figure 14:
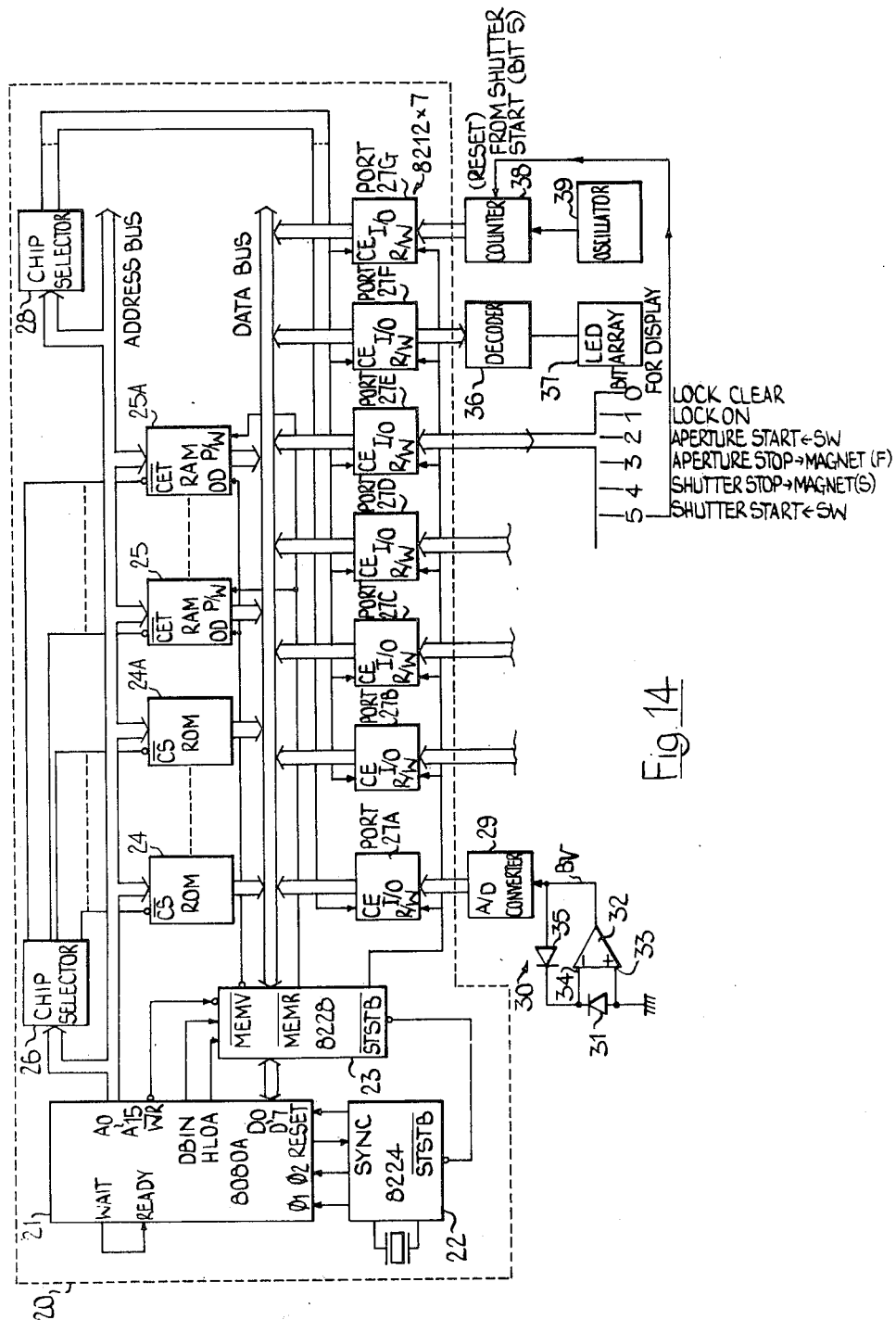
FIG. 14 illustrates the controller of FIG. 1 using an Intel 8080A integrated circuit microprocessor.

Hereinbefore, the theoretical requirements of two controllers having differing methods of operation, both in accordance with the invention, have been disclosed. These requirements may be readily realised by persons skilled in the art by use of commercially available integrated circuit processors. Hereinafter, by way of example, the controller is described with particular reference to FIG. 14 which is a schematic diagram of a controller according to the invention based upon the currently available integrated circuit 8-bit microprocessor, Intel 8080A.

CONTROLLER USING INTEL 8080A MICROPROCESSOR

The controller 20 comprises a microprocessor 21 (Intel 8080A), a systems clock 22 (e.g. Intel 8224), a systems controller 23 (e.g. Intel 8228), read only memory (ROM) chips 24 and 24A, random access memory (RAM) chips 25 and 25A, a selector 26 for selecting the required memory chip during the various stages of operation, a plurality of system input/output (I/O) ports 27A–27G (e.g. Intel 8212), a selector 28 for selecting the I/O ports, and various internal data and address buses and control lines.

Port 27A is connected via an internal bus to an A/D converter 29 which converts an analog signal representative of the brightness ($B_v$) to a corresponding digital representation. The analog signal is derived from a light meter 30 built in the camera and comprising photo diode 31 and a differential or-amplifier 32 having a non-inverting input 33 which is grounded and an inverting input 34 connected to the output of the photo diode 31. A diode 35 is connected between the inverting input and the output of the amplifier 32 as shown. The op-amplifier 32 provides the light meter with an ouput in logarithmic units.

Port 27F is connected via an external bus to decoder 36 which provides signals for an LED array 37 which gives a visual display of shutter speed setting and f number setting and indication of under and over exposure conditions. Port 27G is connected via an external bus to a logarithmic counter 38 which is coupled to an oscillator 39. Counter 38 provides the timing for the shutter of the camera in logarithmic units (to the base 2) and has a reset input coupled back to Port 27E which provides a start signal.

The remaining ports, i.e. Ports 27B to 27E, are coupled via external buses to input/output devices provided in the camera, but not shown herein, as follows. Port 27B is connected to an input device which provides a digital representation of the logarithmic value of the speed ($S_v$) of the film in the camera. The said input device would normally be a manually controllable device which is set when the film is inserted in the camera. Means, however, could be used which automatically interacts with a characterising profile or a magnetic code on the film carrier, for example, so as to set this input without the necessity for manual control. Port 27C is connected to the BIAS control as hereinbefore described. Port 27D is connected to an input device providing indications of the lens aperture setting. Also provided through this port interlacing the lens aperture input is a signal representing the state of readiness of the shutter (i.e. Shutter ON). Port 27E is connected to output devices for starting, stopping, locking and starting the shutter and lens aperture actuators.

OPERATION

Two forms of program for the Intel 8080A microprocessor are described in detail hereinafter with reference to FIGS. 18–28, one corresponding to the flowcharts of FIGS. 2 to 9 and the other corresponding to the flowcharts of FIGS. 10–12 and with reference to the program listing given hereinafter. These programs differ in the manner of determining FSET and SSET, the remaining operation being substantially the same.

Upon the light meter 30 being switched on the light intensity is determined using photo diode 31. The voltage across the photo diode is scaled logarithmically by amplifier 32 to give a brightness value $B_v$ which is converted into suitable digital form by A/D converter 29. The digital output is made available to the microprocessor 20 via input port 27A. The film speed in logarithmic units $S_v$, the control of which has been previously set as aforesaid, is read into port 27B and the BIAS value $B_v$ as set by the operator by means of the BIAS control on the camera is read into port 27C. These values are stored temporarily in the registers in the microprocessor. The exposure value Ev is calculated under program control from the brightness value $B_v$ and film speed value $S_v$ so that $Ev = B_v + S_v$, and is also stored in a register. Previously stored in ROM 24, 24A is the particular program being used and certain fixed values used for testing purposes. In the second program the ROM will also contain the values representative of the table illustrated in FIG. 13.

The bits of the binary code output of port 27E are used to provide the functions given in Table I.

TABLE I

| BIT | FUNCTION |
|---|---|
| 0 | Lock clear |
| 1 | Lock on |
| 2 | Aperture start, stop down |
| 3 | Aperture stop |
| 4 | Shutter stop |
| 5 | Shutter start, counter 38 reset |

The binary code output of port 27F and the interpretation thereof by decoder 36 are given in Table II.

TABLE II

| Bit 7 | 6 | 5 | 4 | 3 | 2 | 1 | 0 | Display |
|---|---|---|---|---|---|---|---|---|
| 1 | 0 | 0 | 0 | 0 | 0 | 0 | 0 | Clear |
| 0 | 0 | 0 | 1 | 0 | 0 | 0 | 1 | Over exposure |
| 0 | 0 | 1 | 0 | 0 | 0 | 1 | 0 | Under exposure |
| 0 | 0 | 1 | 1 | 0 | 0 | 0 | 0 | ⎫ |
| 0 | 0 | 1 | 1 | 0 | 0 | 0 | 1 | ⎪ |
| 0 | 0 | 1 | 1 | 0 | 0 | 1 | 0 | ⎪ |
| . | . | . | . | . | . | . | . | ⎬ Consecutive values of SSET |
| . | . | . | . | . | . | . | . | ⎪ |
| 0 | 0 | 1 | 1 | 1 | 1 | 0 | 1 | ⎪ |
| 0 | 0 | 1 | 1 | 1 | 1 | 1 | 0 | ⎪ |
| 0 | 0 | 1 | 1 | 1 | 1 | 1 | 1 | ⎭ |
| 0 | 1 | 0 | 0 | 0 | 0 | 0 | 0 | ⎫ |
| 0 | 1 | 0 | 0 | 0 | 0 | 1 | 0 | ⎪ |
| . | . | . | . | . | . | . | . | ⎬ Consecutive values of FSET |
| 0 | 1 | 0 | 0 | 1 | 1 | 0 | 1 | ⎪ |
| 0 | 1 | 0 | 0 | 1 | 1 | 1 | 0 | ⎪ |
| 0 | 1 | 0 | 0 | 1 | 1 | 1 | 1 | ⎭ |

OVERALL TIMING

Figure 15:
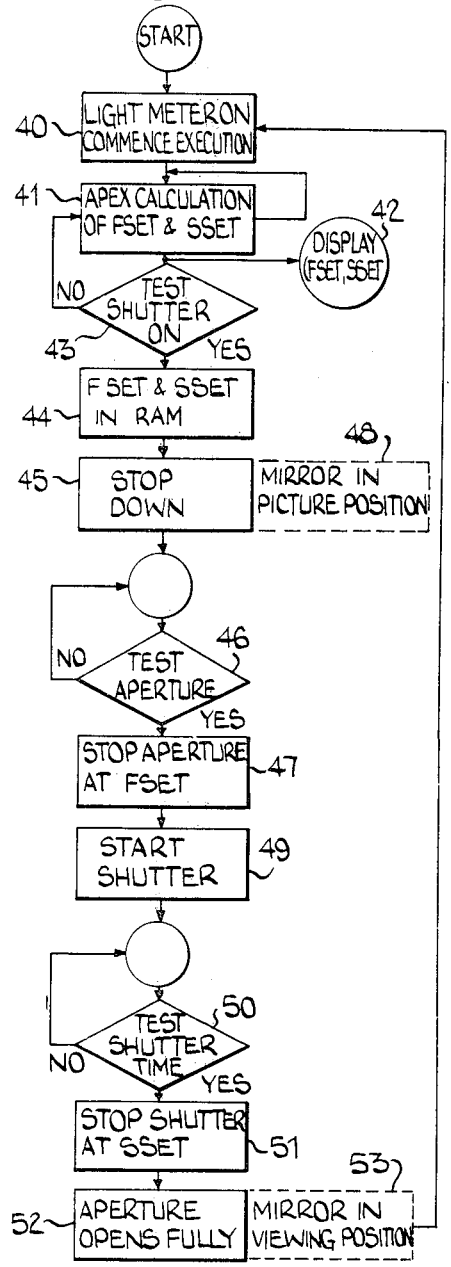
FIG. 15 illustrates the overall timing diagram of the controller of FIG. 14.

Referring now to FIG. 15, which shows the timing of the Intel 8080A microprocessor program, in the first step (step 40) the light meter is switched on and the program commences execution. At the next step (step 41) the exposure value Ev is calculated and tested. If Ev is in the range where a picture may be taken the picture-taking sequence is commenced. If it is not, the camera is made inoperative by the output of bit 1 over port 27E, the over or under exposure condition is indicated in the display 37 by the output of control bytes over port 27F (in step 42) and the cycle is repeated to check for any change of condition.

When the exposure value Ev is in the said range, the values for FSET and SSET are calculated and the shutter speed and aperture are indicated in the display 37 by the output of control bytes over port 27F (step 42). The shutter release is then tested in step 43 to see if it is set ON. If it is not set ON the program returns to step 41. If the shutter is set ON the program moves on to step 44 in which the determined values of FSET and SSET are confirmed as being stored in RAM 25, 25A and then to steps 45–47 (and step 48 if the camera is a reflex camera) in which the aperture is set using port 27E to initiate stopping down (step 45), port 27D to sense the actual aperture setting of the lens (step 46) and port 27E to terminate the stopping down (step 47) when the value for the aperture corresponds to FSET. If the camera is a reflex camera, the viewing mirror is moved in step 48 coincident with step 45 to the picture-taking position. When the aperture is set the program steps on (steps 49–51) to control the starting and stopping of the shutter using port 27E to provide the starting and stopping signals and port 27G to provide the timing for the stop signal, the shutter being timed by the microprocessor using the value SSET as a reference for comparison with the value in the counter 38. To start the shutter, bit 5 of the output of port 27E is used and this bit also resets counter 38. Upon the value SSET being reached the shutter is stopped by means of bit 4 in the output of port 27E. The program then returns in step 52 to the commencement of the aforesaid sequence (at step 40).

In the final step, step 52, the lens is stopped fully open. With a reflex camera a further additional step 53 is included, coincident with step 52, in which the viewing mirror is moved to the viewing position.

These steps are summarised in Table III hereunder.

TABLE III

| Step | Action |
|---|---|
| 40 | On lightmeter SW, ON program, execution commences. |
| 41 | APEX Calculation i.e. FSET, SSET calculated and values displayed at step 42. If Ev is range execution continues at step 43. If not, over or underexposure condition is displayed in step 42 and step 41 is repeated. |
| 42 | Display f-number and shutter speed, under or over exposure indications. |
| 43 | Test shutter. If ON, continue at step 44, if OFF return to step 41. |
| 44 | FSET and SSET in memory. |
| 45, 46, 47 | may occur simultaneously with 48. |
| 45 | Initiate stopping down. |
| 46 | TEST aperture. Is f-number set near enough FSET. If Yes continue to step 47. If No repeat test. |
| 47 | Stop aperture at FSET and wait for step 48 to complete if necessary. |
| 48 | Mirror in picture position. Wait if necessary for step 47 to complete - OPTIONAL STEP. |
| 49 | Open shutter. |
| 50 | Test shutter time. Is time near enough SSET. If Yes continue to step 51. If No repeat test. |
| 51 | Stop shutter at SSET. |
| 52 | APERTURE FULLY OPEN. RETURN TO STEP 40. |
| 53 | MIRROR in viewing position - OPTIONAL STEP. |

DESCRIPTION OF DETAILED PROGRAM USING INTEL 8080A

EXAMPLE 1

This will be described with reference to the tables of FIGS. 16 and 17 and the flowcharts of FIGS. 18–26. In FIG. 16 are shown the ROM and RAM addresses of the values of the functions of (F) and (S) and the function OFFSET, and the abbreviations used therefor in the flowcharts of FIGS. 18–27. FIG. 17 is a list of the registers contained in the 8080A chip used for temporary storage of data or addresses as indicated.

Figure 18:
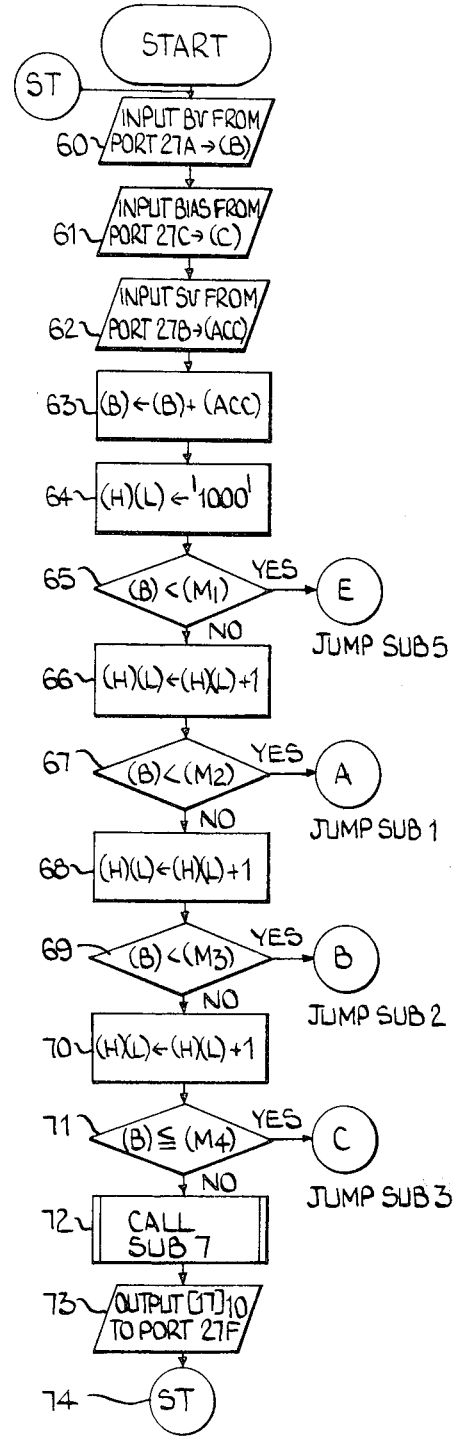

Notation used in flowcharts:
[ ]$_{10}$ represents decimal constant
( ) represents contents of memory
' ' represent memory address in hexadecimal code The program commences with step 60 of FIG. 18 which corresponds to paths 1 and 6 of FIG. 2.

Step
60 Input B$_y$—(Brightness value) from port 27A into B register

61 Input BIAS from port 27C into C register

62 Input $S_v$—(film speed) from port 27B into accumulator

63 Increase B register by value in accumulator, i.e. Ev now in B register.

64 Set address '1000' hexadecimal, i.e. address of $M_1$ in H, L register pair. These registers are used for accessing values $M_1$, $M_2$ etc. described in FIG. 16 and carrying out tests on them.

65 Test if (B) register $<(M_1)$. If Yes jump to SUB 5—FIG. 24. If No step on.

66 Increase address in H, L register pair by 1

67 Test if (B) register $<(M_2)$. If Yes jump to SUB 1 FIG. 19. If No step on.

68 Increase address in H, L register pair by 1

69 Test if (B) register $<(M_3)$. If Yes jump to SUB 2. If No step on.

70 Increase address in H, L register pair by 1

71 Test if (B) register $\leq(M_4)$. If Yes jump to SUB 3 FIG. 21. If No step on.

72 Call SUB 7 i.e. set lock on and clear display

73 Output $[17]_{10}$ to Port 27F i.e. display over exposure. Jump to ST i.e. Step 60 in this figure.

As noted above program jumps occurred at steps 65 (SUB5), 67 (SUB1), 69 (SUB2) and 71 (SUB3). These jumps are shown in FIGS. 24, 19, 20 and 21 respectively and relate respectively to paths 2 to 5 of FIG. 2. FIG. 19 (SUB1) corresponds to path 3.

80 Set (D) register to $(M_6)$

81 Set accumulator to (B) register

82 Set accumulator to (B) register—$(M_6)$

83 Call SUB6 i.e. multiply accumulator by (C) register with product in accumulator 84 Set $(R_1)$ to accumulator 85 Set accumulator to $(M_5)$ 86 Increase accumulator by value in (B) register 87 Rotate accumulator right through carry 88 Set $(R_2)$ to accumulator 89 Set (D) register to $(M_5)$ 90 Set accumulator to (B) register 91 Decrease accumulator by value in (D) register 92 Rotate accumulator right through carry 93 Set $(R_3)$ to accumulator 94 Jump to SUB4 FIG. 22

FIG. 20 (SUB2) corresponds to Path 4

100 Set accumulator to $(M_7)$

101 Call SUB6 i.e. Set accumulator to (C) register $\times$ accumulator

102 Set $(R_1)$ to accumulator

103 Set accumulator to $(M_8)$

104 Rotate accumulator right through carry

105 Set $(R_2)$ to accumulator

106 Set (D) register to accumulator

107 Set accumulator to (B) register

108 Decrease accumulator by value in (D) register

109 Set $(R_3)$ to accumulator

110 Jump to SUB4 FIG. 22

FIG. 21 (SUB3) corresponds to Path 5

111 Set accumulator to $(M_9)$

112 Decrease accumulator by (B) register

113 Call SUB6 i.e. set accumulator to (C) register $\times$ accumulator

114 Set $(R_1)$ to accumulator

115 Set accumulator to $(M_{10})$

116 Increase accumulator by value in (B) register

117 Rotate accumulator right through carry

118 Set $(R_2)$ to accumulator

119 Set (D) register to $(M_{10})$

120 Set accumulator to (B) register

121 Decrease accumulator by (D) register

122 Rotate accumulator right through carry

123 Set $(R_3)$ to accumulator

124 Jump to SUB4 FIG. 22

The flow charts of FIGS. 19-21 terminate in jumps to SUB4. This subroutine which is illustrated in FIG. 22 and described below, implements the steps of
  Set FSET to FREF+OFFSET
  Set SSET to SREF−OFFSET
These steps occur in paths 3, 4 and 5 of the aforesaid FIG. 2.

FIGURE 22 SUB4

130 Set (D) register to $(R_1)$

131 Set accumulator to $(R_2)$

132 Increase accumulator by value in (D) register

133 Set $(R_4)$ to accumulator

134 Set accumulator to $(R_3)$

135 Decrease accumulator by value in (D) register

136 Set $(R_5)$ to accumulator

137 Jump to SUB8—FIG. 26

FIGURE 24 (SUB5) corresponds to Path 2.

140 Call SUB7 i.e. set lock on and clear display

141 Output $[34]_{10}$ to port 27F i.e. underexposure display

142 Jump to ST—Step 60 FIG. 18

In addition to the aforesaid jumps at steps 65-71, subroutines SUB6 and SUB7 are called respectively at steps 83, 101, 113 and 72. These subroutines are shown in FIGS. 23 and 25 and comprise the following steps.

FIGURE 23 (SUB6)

This is a standard subroutine to multiply accumulator by (C) register and put the product in accumulator. Multiplication is performed using repeated addition. Only the accumulator is changed by the execution of the subroutine.

FIG. 25 (SUB7)

145 Output $[2]_{10}$ to port 27E—Set lock on

146 Output $128_{10}$ to port 27F—clear display

147 Return to point of call and continue

The aforesaid subroutine 4 (SUB4) terminates in a jump to the subroutine SUB8. This is illustrated in FIG. 23 and comprises:

150 Output $[1]_{10}$ to port 27E i.e. clear lock

151 Output $128_{10}$ to port 27F i.e. clear display

152 Output $(R_5)$ to port 27F i.e. display shutter speed

153 Output $(R_4)$ to port 27F i.e. display f-number

154 Input Re from port 27D into accumulator (where Re is the shutter ready signal, i.e. a signal indicating that the shutter is set.

155 Test if Bit 0 of accumulator is O. If Yes, release is not ready so jump to ST - step 60 FIG. 18. If No, step on and commence exposure.

156 Set (D) register to $(R_4)$

157 $[8]_{10}$ to port 27E i.e. start stopping lens down

158 Input Av from port 27D into accumulator, i.e. input actual aperture setting

159 Set 000 at 0, 1, 2 bits of accumulator

160 Test if accumulator $<$(D) register. If Yes, step on. If No jump to step 158

161 Output $[4]_{10}$ to port 27E i.e. terminate stopping down

162 Set (D) register to $(R_5)$

163 Output $[32]_{10}$ to port 27E i.e. start shutter

164 Input "Tv" from port 27G into accumulator, i.e. actual time shutter open

165 Test if accumulator $<$(D) register. If Yes, step on. If No, jump to step 164

166 Output $[16]_{10}$ to port 27E i.e. stop shutter
167 Jump to ST, i.e, step 60, FIG. 18.

EXAMPLE II

This is a modification of the aforesaid program, the latter being diverted between steps 65 and 72, through steps 75 and 76 as shown in FIG. 27 as follows:

75 Increase address in (H, L) register pair by 3, i.e. address now referenced is that of $M_4$.

76 Test if (B) register $\leq$(M). If Yes, jump to SUB9 FIG. 28 as shown below. If No continue at step 72 and complete steps 72, 73, 74 as in EXAMPLE I.

The jump to a subroutine at step 75 (i.e. SUB9 FIG. 28) corresponds to Path 11 in FIG. 12. It terminates in a jump to the subroutine of FIG. 26 i.e. SUB8. Subroutines SUB1-SUB4 and SUB6 are not required in this program. SUB9 comprises steps 170-176 as follows:

170 Clear accumulator
171 Set (D) register to (B) register—($M_1$)
172 Set (H, L) register pair to address '(D)*10+(C)+2000'—hexadecimal number
173 Set (E) register to (M) i.e. value at address in (H, L) register pair
174 Set ($R_4$) to (E) register
175 Set ($R_5$) to (B) register—(E) register
176 Jump to SUB8 FIG. 26.

The following worked example shows the program method in EXAMPLE II:

Ev = 2 (B) register
BIAS = $-\frac{3}{8}$ (C) register has bias code 1

From FIG. 13 FSET should be $1\frac{1}{8}$ the value at address '2011'. This checks with the value given to the H, L) register pair by Steps 171, 172 of FIG. 27.

(D)−(B)−($M_1$)=(B)−1=2−1=1 as ($M_1$)=$F_{min}$+$S_{min}$=1
(H)
(L)−'D*10+(C)+2000'='1*10+1+2000'='2011'
which is the required address.

PROGRAM ASSEMBLY LANGUAGE LISTING

Hereinafter the assembly language for the aforesaid programs using the INTEL 8080 microprocessor is listed.

Note 1

SUB9 is not relevant for EXAMPLE I.
SUBS1-4 and SUB6 are not relevant for EXAMPLE II.

Note 2

In the program list symbols are used to signify port addresses as follows.

| Symbol | Port |
|--------|------|
| Ap | 27A |
| Bp | 27B |
| Cp | 27C |
| Dp | 27D |
| Ep | 27E |
| Fp | 27F |
| Gp | 27G |

Program List

| NAME | MNEMONIC |
|------|----------|
|      | ORG $\phi$ |
|      | LXI H, DATA |
|      | MVI B, 12 |
|      | XRA A |
|      | MOV M, A |
|      | INX H |
|      | DCR B |
|      | JNZ $-3 |
|      | LXI SP, USESP |
|      | SHLD SSAVE |
| NAME | MNEMONIC |
| STAT | IN Ap |
|      | MOV B, A |
|      | IN Cp |
|      | MOV C, A |
|      | IN Bp |
|      | ADD B |
|      | MOV B, A |
|      | LXI H, 1$\phi\phi$ |
|      | CMP M |
|      | JC SUB5 |

| EXAMPLE I | EXAMPLE II |
|-----------|------------|
| INX H | INX H |
| CMP M | INX H |
| JC SUB1 | INX H |
| INX H | CMP M |
| CMP M | JC SUB9 |
| JC SUB2 | JZ SUB9 |
| INX H | |
| CMP M | |
| JC SUB3 | |
| JZ SUB3 | |

| NAME | MNEMONIC |
|------|----------|
|      | CALLSUB7 |
|      | MVI A, 11H |
|      | OUT Fp |
|      | JMP STAT |
| NAME | MNEMONIC |
| SUB1 | LDA 1$\phi\phi$5 |
|      | MOV D, A |
|      | MOV A, B |
|      | SUB D |
|      | CALLSUB6 |
|      | STA 4$\phi\phi$B |
|      | LDA 1$\phi\phi$4 |
|      | ADD B |
|      | RAR |
|      | STA 4$\phi\phi$C |
|      | LDA 1$\phi\phi$4 |
|      | MOV D, A |
|      | MOV A, B |
|      | SUB D |
|      | RAR |
|      | STA 4$\phi\phi$D |
|      | JMP SUB4 |
| SUB2 | LDA 1$\phi\phi$5 |
|      | CALLSUB6 |
|      | STA 4$\phi\phi$B |
|      | LDA 1$\phi\phi$7 |
|      | RAR |
|      | STA 4$\phi\phi$C |
|      | MOV D, A |
|      | MOV A, B |
|      | SUB D |
|      | STA 4$\phi\phi$D |
|      | JMP SUB4 |
| NAME | MNEMONIC |
| SUB3 | LDA 1$\phi\phi$8 |
|      | SUB B |
|      | CALLSUB6 |
|      | STA 4$\phi\phi$B |
|      | LDA 1$\phi\phi$9 |
|      | ADD B |
|      | RAR |
|      | STA 4$\phi\phi$C |
|      | LDA 1$\phi\phi$9 |
|      | MOV D, A |
|      | MOV A, B |
|      | SUB D |
|      | RAR |
|      | STA 4$\phi\phi$D |
|      | JMP SUB4 |
| SUB4 | LDA 4$\phi\phi$B |
|      | MOV D, A |
|      | LDA 4$\phi\phi$C |
|      | ADD D |
|      | STA 4$\phi\phi$E |
|      | LDA 4$\phi\phi$D |
|      | SUB D |

```
              STA 4φφF
              JMP SUB8
NAME  MNEMONIC
 SUB8 MVI A, 1
              OUT Ep
              MVI A, 128
              OUT Fp
              LDA 4φφD
              OUT Fp
              LDA 4φφE
              OUT Fp
              IN Dp
              ANI φ1H
              JZ STAT
              LDA 4φφE
              MOV D, A
              MVI A, 8
              OUT Ep
 LOOP1 IN Dp
              ANI 248
              CMP D
              JM LOOP1
              MVI A, 4
              OUT Ep
              LDA 4φφF
              MOV D, A
              MVI A, 32
              OUT Ep
              MOV A, D
NAME  MNEMONIC
 LOOP2 IN Gp
              SUB D
              JP LOOP2
              MVI A, 16
              OUT Ep
              JMP STAT
 SUB6 PUSH D
              MOV D, C
              MOV E, A
 LOOP3 ADD E
              DCR D
              JNZ LOOP3
              POP D
              RET
 SUB7 MVI A, φ2
              OUT Ep
              MVI A, 128
              OUT Fp
              RET
 SUB5 MVI A, φ2
              OUT Ep
              MVI A, 128
              OUT Fp
              MVI A, 34
              OUT Fp
              JMP STAT
NAME  MNEMONIC
 SUB9 XRA A
              MVI E, φφH
              LXI H, 1φφφ
              MOV A, B
              SUB M
              XRA A
              JM LOOPC
 LOOPA ADI 1φ
              JNC LOOPB
              INC E
 LOOPB DCR D
              JP LOOPA
 LOOPC ADD C
              MOV L, A
              XRA A
              ADD E
              ADI 2φH
              MOV H, A
              MOV E, M
              LXI H, 4φφE
              MOV M, E
              INX H
              MOV A, B
              SUB E
              MOV M, A
```

```
              JMP SUB8
```

The foregoing detailed descriptions are given primarily for clarity of understanding and should not be regarded as limiting the nature of the invention. Modifications which are obvious to those skilled in the art upon reading this disclosure may be made without departing from the spirit of the invention or the scope of the appended claims.

I claim:

1. In a camera having adjustable lens aperture, adjustable shutter speed, controllable setting means for automatically setting the shutter speed and the lens aperture, and further including means providing a signal representing an instant exposure value required for proper exosure of the film therein, the lens aperture and the shutter speed being adjustable within respective f-number limits and shutter speed limits, said limits in combination defining overall minimum and maximum exposure values within the range of the camera, the improvement of a controller comprising:

operator-set bias setting means which provides a bias signal representative of a desired relationship between lens f-number and shutter speed;

a processor means for controlling said controllable setting means to provide full selection from all possible f-number and shutter speed combinations that define the instant exposure value, said processor means including:

first means for storing the instant exposure value signal and the bias signal; and second means for producing a shutter speed setting signal and an aperture setting signal for controlling said controllable setting means, the second means being responsive to the stored instant exposure value and bias signals to produce the setting signals so that shutter speed and aperture setting are each a first mathematical function of instant exposure value and bias signal when the exposure value is within a first range of a plurality of ranges of values, and so that shutter speed and aperture setting are each a second mathematical function of instant exposure value and bias signal when the exposure value is within a second one of such ranges of values.

2. In a camera having adjustable lens aperture and shutter speed and means for automatically setting the shutter speed and the aperture of the lens thereof and further including means providing signals representing the required exposure value for the film therein the improvement of a controller comprising operator-set bias setting means which can be set to match any exposure value within the range of the camera such that in respect of each setting it provides a respective signal representative of a desired relationship between lens f-number and shutter speed and a processor means connected to command the said signals and to provide output signals for said setting means for setting the said f-number and shutter speed in relation to the setting of the bias setting means, said processor means comprising means for putting said processor into a start condition whereby it is made ready to set the camera for taking the photograph, register means for storing the instant exposure value and the bias signal means for testing said instant exposure value to determine whether it is within prescribed minimum and maximum limit values which are determined by the camera parameters and for resetting the processor to its start condition if the exposure value is outside the said limit values, and means responsive to said stored values only when the said exposure value is one of a range of values within the said limit values, for determining the optimum camera shutter speed and lens f-number for the given conditions and bias setting, said controller thereby providing by full operation of the bias means full selection from all possible combinations of f-number and shutter speed for the camera.

3. A camera controller according to claim 2 including means in said camera responsive to the light incident on the said lens at any instant which provides a signal representative of the brightness value and means for determining therefrom the instant exposure value and wherein the controller retests periodically and automatically the f-number and shutter speed settings in relation to the instant exposure value and bias setting and resets them as necessary thereby maintaining the camera in a state of maximum readiness.

4. A camera controller according to claim 3 further comprising display means coupled to register means to provide digital displays of the lens f-number and the shutter speed settings and wherein the said controller periodically updates the said register contents so as to contain the instant f-number and shutter speed settings.

5. A camera controller according to claim 4 wherein the said display means comprises an LED display.

6. A camera controller according to claim 2 further comprising camera disabling means for preventing exposure of a film within the camera by operation of the shutter when the said exposure value is outside the said limit values.

7. A camera controller according to claim 6 including retest means for automatically retesting the instant exposure value signal after the camera has been disabled, said retest means re-enabling said camera.

8. A camera controller according to claim 2 comprising further testing means for testing the exposure value signal to determine whether it lies within at least one other predetermined range of values, said other range being narrower than the first said range.

9. A camera controller according to claim 8 wherein said further testing means test the said exposure value signal in respect of a plurality of contiguous ranges.

10. The camera controller of claim 2 further comprising means which provide an indication when the instant exposure value is such as to fall outside the said limit values.

11. A camera controller for use with a camera having adjustable lens aperture and shutter speed and means responsive to control signals from the controller for controllably setting the speed of the shutter and the aperture of the lens thereof and further having means for determining the required exposure value, the improvement of an operator-set bias setting means which can be set to match any expsoure value within the range of the camera such that in respect of each setting it provides a respective signal representative of a desired relationship between the lens f-number and shutter speed and a processor means connected to command the said bias signal and a signal corresponding to the exposure value and to provide said control signals for setting the said aperture and shutter speed to provide full selection from all possible combinations, said processor means comprising means for putting said processor into a start condition whereby it is made ready to set the camera for taking a photograph, an ROM which stores all possible values of f-number and/or shutter speed for the lens/shutter combination of the camera and connected to receive said bias and exposure value signals which determine an address in said ROM constructed from said signals and means for testing said instant exposure value to determine whether it is within prescribed minimum and maximum limit values which are determined by the camera parameters and for resetting the processor to its start condition if the expsoure value is outside the said limit values, said controller including means responsive to the signals stored in the addressed location of the ROM so as to provide said control signals only when said exposure value is one of a range of values within the said limit values.

12. The camera controller of claim 11 further comprising display means coupled to receive said control signals and adapted to provide digital displays of the instant lens f-number and shutter speed setting.

13. The camera controller of claim 12 further comprising camera disabling means coupled to receive an output from the testing means, the latter being adapted to provide activating signals to said disabling means when the instant exposure value falls outside the range of exposure values within the capabilities of the camera and said disabling means being adapted to provide a camera disabling signal when activated.

14. The camera controller of claim 13 wherein said testing means comprises a microprocessor coupled to said ROM and wherein said ROM additionally stores the program for said microprocessor.

15. The camera controller of claim 13 further comprising indicating means for providing a visual indication when the said disabling means is activated.

16. A camera including an adjustable shutter, means for controllably setting the shutter speed, a lens having an adjustable aperture, means for controllably setting the aperture of the lens and a controller for providing control signals to said means for setting the shutter speed and lens aperture, said controller comprising:
  (i) A bias setting means for providing a digital signal (BIAS) representative of a desired relationship between f-number and shutter speed, said bias setting means incorporating a manual operator for adjusting the value of the bias signal;
  (ii) exposure value means for providing a digital signal (Ev) indicative of the required exposure value corresponding to the light conditions, said means incorporating means for determining the light intensity in the field of view of the camera and means for compensating said light intensity signal in accordance with the exposure speed of the film in use in the camera; and
  (iii) a microprocessor connected to command the bias signal (BIAS) and the exposure value signal (Ev) and provide output signals for said means for setting the shutter speed and lens aperture, said microprocessor comprising:
    (a) means for putting said microprocessor into a start condition whereby it is made ready to set the camera for taking a photograph;
    (b) first register means for storing the instant exposure and bias signals; and
    (c) means responsive to said stored values for testing said instant exposure value to determine whether it is within prescribed minimum and maximum limit values which are determined by the camera parameters and for resetting the processor to its start condition if the exposure value is outside the said limit values, and for calculating the appropriate camera shutter speed and lens f-number for the given conditions and bias setting only when the said exposure value is one of a range of values within the said limit values, said controller thereby providing full selection from all possible combinations of f-number and shutter speed for the camera.

17. A camera according to claim 16 wherein said calculating means comprises testing means coupled to said first register means for sequentially testing said exposure value signal to determine in which one of a sequence of contiguous ranges of values it occurs.

18. A camera according to claim 17 comprising second register means coupled to said calculating means for receiving therefrom signals representing the calculated f-number and shutter speed.

19. A camera according to claim 18 further comprising display means coupled to said second register means to provide digital displays of the instant lens f-number and shutter speed settings.

20. A camera according to claim 17 further comprising disabling means coupled to said calculating means to receive camera disabling signals therefrom, said calculating means being adapted to provide activating signals to said disabling means when the instant exposure value is such as to fall outside the said contiguous ranges of values, and said disabling means being arranged to prevent exposure of the film within the camera when the said disabling signal is received.

21. A camera according to claim 20 further comprising means which provide an indication when the instant exposure value is such as to fall outside the said contiguous ranges.

22. A camera according to claim 18 wherein said testing means tests for the following conditions of exposure value signal (Ev):

$Ev < (SMIN + FMIN)$      (i)

$Ev < (SMIN + FMAX)$      (ii)

$Ev < (SMAX + FMIN)$      (iii)

$Ev < (SMAX + FMAX)$      (iv)

where SMIN, SMAX, FMIN, FMAX are digital signals stored in a ROM, SMIN, and SMAX being representative of the minimum and maximum time setting of the camera shutter and FMIN and FMAX being representative of the minimum and maximum lens f-number setting, and thereafter the said microprocessor steps through a program according to a first path if test (i) is affirmative, according to a second path if test (ii) is affirmative, according to a third path if test (iii) is affirmative, according to a fourth path if test (iv) is affirmative and according to a fifth path if test (iv) is negative, where said first and fifth paths comprise sub-routines for retesting the exposure value signal, the said second path steps through the operations:

Set OFFSET to $(Ev - FMIN - SMIN) \times BIAS$
Set FREF to $(Ev + FMIN - SMIN) \times \frac{1}{2}$
Set SREF to $(Ev - FMIN + SMIN) \times \frac{1}{2}$
Set FSET to $(FREF + OFFSET)$
Set SSET to $(SREF - OFFSET)$ the said third path steps through the operations:
set OFFSET to $(FMAX - FMIN) \times BIAS$
Set FREF to $(FMAX + FMIN) \times \frac{1}{2}$
Set SREF to $(Ev - FREF)$
Set FSET to $(FREF + OFFSET)$
Set SSET to $(SREF - OFFSET)$ and the said fourth path steps through the operations:
Set OFFSET to $(FMAX + SMAX - Ev) \times BIAS$
Set FREF to $(Ev + FMAX - SMAX) \times \frac{1}{2}$
Set SREF to $(Ev - FMIN + SMAX) \times \frac{1}{2}$
Set FSET to $(FREF + OFFSET)$
Set SSET to $(SREF - OFFSET)$ where OFFSET, FREF, SREF, FSET and SSET are values stored in the said second register means, and FSET and SSET represent the output f-number and shutter setting signals of the controller.

23. A camera including an adjustable shutter, means for controllably setting the shutter speed, a lens having an adjustable aperture, means for controllably setting the aperture of the lens and a controller for providing control signals to said means for setting the shutter speed and lens aperture, said controller comprising:

(i) a bias setting means for providing a digital signal (BIAS) representative of a desired relationship between f-number and shutter speed, said bias setting means incorporating a manual operator for adjusting the value of the bias signal;

(ii) exposure value means for providing a digital signal (Ev) indicative of the required exposure value corresponding to the light conditions, said means incorporating means for determining the light intensity in the field of view of the camera and means for compensating said light intensity signal in accordance with the exposure speed of the film in use in the camera, and (iii) a microprocessor connected to command the bias signals (BIAS) and the exposure value signal (Ev) and provide said control signals for said means for setting the shutter speed and lens aperture, said microprocessor comprising:

(a) means for putting said microprocessor into a start condition whereby it is made ready to set the camera for taking a photograph;

(b) an ROM which stores signals corresponding to all possible values of f-number and shutter speed for the shutter lens combination of the camera; and (c) calculating means connected to receive said bias and exposure value signals which tests said instant exposure to determine whether it is within prescribed minimum and maximum limit values which are determined by the camera parameters and for resetting the processor to its start condition if the exposure value is outside the said limit values, and which calculates an address in said ROM corresponding to said signals only when said exposure value is one of a range of values within the said limit values, and wherein said ROM includes means responsive to the signals stored in the address location of the ROM and which provides said control signals to provide full selection from all possible combinations of f-number and shutter speed for the camera.

24. A camera according to claim 23 wherein said microprocessor further comprises first and second register means for respectively storing said exposure value and bias signals in said first means and signals corresponding to the instant f-number and shutter speed setting in said second means.

25. The camera of claim 24 further comprising display means coupled to said second register means so as to receive said control signals and adapted to provide digital displays of the instant lens f-number and shutter speed settings.

26. The camera of claim 25 wherein said calculating means comprises testing means coupled to said first register means for sequentially testing said exposure value signal to determine in which one of a sequence of contiguous ranges of values it occurs.

27. The camera of claim 26 further comprising camera disabling means coupled to receive an output from said testing means and wherein said testing means is adapted to provide activating signals to said disabling means when the instant exposure value falls outside the range of exposure values within the capabilities of the camera, and said disabling means is adapted to prevent exposure of the film within the camera when the disabling means is activated.

28. The camera of claim 26 wherein said testing means tests for the following conditions of exposure value signal (Ev):

$$Ev < (SMIN + FMIN) \quad (i)$$

$$Ev < (SMAX + FMAX) \quad (ii)$$

where SMIN, SMAX, FMIN, FMAX are digital signals stored in a ROM, SMIN and SMAX being representative of the minimum and maximum time setting of the camera shutter and FMIN and FMAX being representative of the minimum and maximum lens f-number setting, and thereafter the said microprocessor steps through a program according to a first path if test (i) is affirmative, according to a second path if test (ii) is affirmative and according to a third path if test (ii) is negative, where said first and third paths comprise subroutines for retesting the exposure value signal and the said path comprises a subroutine in which the Ev and BIAS signal values stored in the said first register means form address signals for addressing at least one table in said ROM so as to derive signals corresponding to the required f-number and shutter speed setting.

29. The camera of claim 28 wherein said second path comprises a step following the reference to said one table in which one of said values FSET, SSET is obtained wherein said calculating means substracts the said one value obtained from the table from the instant Ev signal to obtain the other value of FSET, SSET.

30. The camera of claim 29 wherein said ROM contains a table of FSET values and a table of SSET values and each table is referenced in said second path using the values Ev and BIAS as address signals to obtain the values FSET and SSET.

* * * * *

UNITED STATES PATENT AND TRADEMARK OFFICE
CERTIFICATE OF CORRECTION

PATENT NO. : 4,329,029
DATED : May 11, 1982
INVENTOR(S) : Raphael Haskell

It is certified that error appears in the above—identified patent and that said Letters Patent is hereby corrected as shown below:

Column 4, line 20, "valve" should read -- value --; line 45, "Set OFFSET is" should read -- Set OFFSET to --; line 47, "EV" should read -- Ev --; line 54, "EV" should read -- Ev --; line 60, "EV" should read -- Ev --; line 61, "EV" should read -- Ev --.
 Column 6, line 6, "or-amplifier" should read --op-amplifier --. Column 10, line 43, "23" should read -- 26 --; line 55, before "[8]$_{10}$" insert -- Output --; line 59, "<" should read -- $\leq$ --; line 67, "<" should read -- $\leq$ --. Column 12, line 1, "JNZ $-3" should read -- JNZ $\emptyset$-3 --; line 42, "1$\emptyset\emptyset$5" should read -- 1$\emptyset\emptyset$6 --. Column 14, line 18, "exosure" should read -- exposure --.

Signed and Sealed this

Fourteenth Day of December 1982

[SEAL]

Attest:

GERALD J. MOSSINGHOFF

Attesting Officer

Commissioner of Patents and Trademarks